(12) United States Patent
Gerundt et al.

(10) Patent No.: US 9,514,576 B2
(45) Date of Patent: Dec. 6, 2016

(54) METHOD AND DEVICE FOR DETECTING WEAR ON AN ELECTRIC BICYCLE

(75) Inventors: Oliver Gerundt, Friolzheim (DE); Gregor Dasbach, Reutlingen (DE); Ingo Immendoerfer, Tamm (DE); Ralf Diekmann, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 14/123,852

(22) PCT Filed: Apr. 23, 2012

(86) PCT No.: PCT/EP2012/057411
§ 371 (c)(1),
(2), (4) Date: Mar. 14, 2014

(87) PCT Pub. No.: WO2012/167987
PCT Pub. Date: Dec. 13, 2012

(65) Prior Publication Data
US 2014/0229054 A1 Aug. 14, 2014

(30) Foreign Application Priority Data

Jun. 8, 2011 (DE) ........................ 10 2011 077 181

(51) Int. Cl.
*G01M 17/00* (2006.01)
*G06F 7/00* (2006.01)
(Continued)

(52) U.S. Cl.
CPC ............... *G07C 5/006* (2013.01); *B62J 99/00* (2013.01); *B62M 6/50* (2013.01); *B62J 2099/002* (2013.01);
(Continued)

(58) Field of Classification Search
CPC ................. B62J 2099/0026; B62J 2099/0013;
B62J 2099/002; G07C 5/006; B62M 6/50;
B62M 6/45; B62M 6/55; B60L 2200/12;
B60L 2270/145; G01B 3/46; G01B 5/02;
G01B 5/16; H02J 7/0047
(Continued)

(56) References Cited

U.S. PATENT DOCUMENTS 4,490,127 A * 12/1984 Matsumoto ............ B62M 9/122
280/236
5,370,200 A * 12/1994 Takata .................. B60L 3/0092
180/206.4
(Continued)

FOREIGN PATENT DOCUMENTS

DE 101 16 743 10/2002
DE 10 2011 077 181 12/2012
(Continued)

OTHER PUBLICATIONS

International Search Report for PCT/EP2012/057411, dated Jul. 20, 2012.

*Primary Examiner* — Khoi Tran
*Assistant Examiner* — Jorge Peche
(74) *Attorney, Agent, or Firm* — Norton Rose Fulbright US LLP; Gerard Messina (57) ABSTRACT

A method for detecting wear on at least one component of an electric bicycle includes: monitoring the operating condition of the at least one component with the aid of at least one sensor; detecting the stress on the component over the duration of operation; and displaying the need for service on a display unit as soon as a long-term load threshold defined for this component is reached, to inform the cyclist promptly of the need for service.

17 Claims, 6 Drawing Sheets

(51) Int. Cl.
*G06F 11/30* (2006.01)
*G07C 5/00* (2006.01)
*B62J 99/00* (2009.01)
*B62M 6/50* (2010.01)

(52) U.S. Cl.
CPC . *B62J 2099/0013* (2013.01); *B62J 2099/0026* (2013.01)

(58) Field of Classification Search
USPC ............................................. 701/29.1, 29.4
See application file for complete search history.

(56) References Cited

U.S. PATENT DOCUMENTS

| | | | | |
|---|---|---|---|---|
| 5,505,277 A * | 4/1996 | Suganuma | B62M 6/55 | 180/206.3 |
| 5,525,890 A * | 6/1996 | Iwatsu | G01R 31/3648 | 320/106 |
| 5,602,448 A * | 2/1997 | Yaguchi | B60L 11/1801 | 180/179 |
| 5,751,217 A * | 5/1998 | Kchao | G01R 31/3679 | 324/426 |
| 5,758,735 A * | 6/1998 | MacCready, Jr. | B62M 6/40 | 180/206.5 |
| 5,830,096 A * | 11/1998 | Schmidt | B62M 9/10 | 474/156 |
| 5,865,454 A * | 2/1999 | Campagnolo | B62M 25/08 | 280/238 |
| 5,971,090 A * | 10/1999 | Tanaka | B60L 11/1801 | 180/206.2 |
| 6,163,148 A * | 12/2000 | Takada | B62M 6/45 | 180/206.3 |
| 6,178,824 B1 * | 1/2001 | Hayakawa | F16G 13/00 | 73/828 |
| 6,181,239 B1 * | 1/2001 | Ahmed | F02B 77/081 | 340/438 |
| 6,216,078 B1 * | 4/2001 | Jinbo | B62K 23/06 | 188/24.11 |
| RE37,443 E * | 11/2001 | Yaguchi | B60L 11/1801 | 180/205.1 |
| 6,523,400 B1 * | 2/2003 | Ahmed | G01M 13/023 | 73/114.77 |
| 8,949,022 B1 * | 2/2015 | Fahrner | G01C 21/00 | 340/995.19 |
| 2001/0011809 A1 * | 8/2001 | Fukuda | B62M 9/122 | 280/618 |
| 2002/0107589 A1 * | 8/2002 | Grimm | G05B 23/0245 | 700/90 |
| 2003/0093242 A1 * | 5/2003 | Olsson | G01M 13/021 | 702/182 |
| 2003/0222656 A1 * | 12/2003 | Phillips | G01N 33/2888 | 324/605 |
| 2004/0112129 A1 * | 6/2004 | Lundqvist | B60C 23/0408 | 73/146 |
| 2004/0122618 A1 * | 6/2004 | Suzuki | G07C 3/00 | 702/181 |
| 2004/0164850 A1 * | 8/2004 | Konno | B60R 25/104 | 340/426.1 |
| 2005/0077096 A1 * | 4/2005 | Kokatsu | B62M 6/55 | 180/207.1 |
| 2005/0192142 A1 * | 9/2005 | Stone | F01L 1/024 | 474/101 |
| 2006/0106549 A1 * | 5/2006 | Olsson | G01M 13/021 | 702/34 |
| 2006/0243180 A1 * | 11/2006 | Sundermeyer | A01B 63/00 | 112/470.06 |
| 2007/0222170 A1 * | 9/2007 | Sasnowski | B62M 6/55 | 280/221 |
| 2007/0222427 A1 * | 9/2007 | Takeuchi | G01R 31/043 | 324/71.2 |
| 2008/0162088 A1 * | 7/2008 | DeVaul | A61B 5/0024 | 702/190 |
| 2008/0207402 A1 * | 8/2008 | Fisher | A63B 21/0051 | 482/5 |
| 2009/0011907 A1 * | 1/2009 | Radow | A63B 21/00181 | 482/57 |
| 2009/0120211 A1 * | 5/2009 | Roovers | B62M 6/50 | 73/862.474 |
| 2009/0181826 A1 * | 7/2009 | Turner | A63B 24/0062 | 482/4 |
| 2009/0193907 A1 * | 8/2009 | Wilbur | G01N 3/56 | 73/829 |
| 2010/0131164 A1 * | 5/2010 | Carter | B60L 11/1805 | 701/61 |
| 2010/0282001 A1 * | 11/2010 | Sasaki | B62K 19/34 | 73/862.49 |
| 2011/0033735 A1 * | 2/2011 | Kinoshita | H01M 10/052 | 429/90 |
| 2011/0079453 A1 * | 4/2011 | Wanger | B62K 27/003 | 180/11 |
| 2011/0087446 A1 * | 4/2011 | Redmond | A61B 5/221 | 702/44 |
| 2011/0183805 A1 * | 7/2011 | Chan | B62M 6/50 | 475/254 |
| 2011/0203867 A1 * | 8/2011 | Kakimoto | F16H 7/18 | 180/357 |
| 2011/0254673 A1 * | 10/2011 | Jean | B62M 6/45 | 340/432 |
| 2011/0303474 A1 * | 12/2011 | Kimmich | B62M 9/04 | 180/206.3 |
| 2012/0022800 A1 * | 1/2012 | Lubarsky | G01L 3/242 | 702/41 |
| 2012/0261895 A1 * | 10/2012 | Cote | G01L 5/042 | 280/281.1 |

FOREIGN PATENT DOCUMENTS

| | | | | |
|---|---|---|---|---|
| EP | 2 149 721 | | 2/2010 | |
| FR | 2 938 233 | | 5/2010 | |
| GB | 2260009 A | * | 3/1993 | ............... B62H 5/20 |
| JP | 2008162374 A | * | 7/2008 | |
| WO | WO 2005/080134 | | 9/2005 | |

* cited by examiner

METHOD AND DEVICE FOR DETECTING WEAR ON AN ELECTRIC BICYCLE

BACKGROUND OF THE INVENTION

1. Field of the Invention

The present invention relates to a method and a device for detecting wear on at least one component of an electric bicycle.

2. Description of the Related Art

The present invention relates to a method for detecting wear on the chain drive of an electric bicycle, the chain drive including an electric motor driving at least one driveshaft equipped with at least one sprocket wheel, at least one output shaft, also equipped with at least one sprocket wheel, and at least one closed chain, which is guided over a sprocket wheel of the driveshaft and a sprocket wheel of the output shaft, so that the chain transmits the torque acting on the driveshaft to the output shaft.

Many components of a bicycle are not designed for durability but instead have only operational stability and therefore must be serviced regularly or even replaced. Thus, the brakes and the bicycle lights, for example, must be serviced regularly to ensure operational reliability of the bicycle. Other components, for example, the frame, are subject to wear or fatigue, which may result in impaired traffic safety of the bicycle. Service intervals are therefore stipulated for some bicycle components, for example, the brakes, the gearshift system and the bicycle fork. However, these fixed intervals are not adapted to the actual individual wear and stress on the bicycle.

The efficiency of the drive of an electric bicycle depends to a significant extent on the condition of the chain, the chain rings and pinions. In practice, bushed roller chains or bearing-collar chains are generally used as the bicycle chain. During operation, a wear-inducing friction occurs in the interior of the chain, in particular between the bushings or bearing collars and the corresponding rolls, resulting in an increase in the chain pitch and consequently a lengthening of the chain. Since the chain pitch is then no longer tailored to the tooth spacing of the sprocket wheels, i.e., the chain ring and pinion, there is a decline in torque transmission efficiency. Furthermore, the sprocket wheels are subject to increased wear. The wear depends to a significant extent on the degree of soiling of the chain and sprocket wheels because dirt acts like an abrasive. The pinion and chain rings may be used further only if the chain is changed promptly.

Therefore, not only do regular inspection and service of the chain affect the efficiency of the chain drive, but also the running performance of the chain and sprocket wheels may be significantly improved in this way.

Wear on the chain may be checked manually in the case of chain rings manufactured according to the standard. The wear limit has been reached if the chain may be lifted away from the gear rim by more than 5 mm, and the chain should be replaced. Wear testing may be carried out with the aid of a chain gauge, regardless of the type of chain ring. The length of the chain is measured over a defined number of chain links. Both methods are based on a manual inspection and cannot be carried out during ongoing operation, i.e., while cycling. These test methods require technical knowledge and are not necessarily carried out regularly.

BRIEF DESCRIPTION OF THE INVENTION

The present invention proposes that the aging of individual components of an electric bicycle be monitored automatically to inform the cyclist promptly of the need for service.

The operating condition of at least one selected component is therefore monitored with the aid of at least one sensor. The stress on this component is detected over the duration of operation of the electric bicycle. According to the present invention, the need for service is displayed for the cyclist on a display unit as soon as a long-term load threshold, which is defined for the component, has been reached.

The method according to the present invention opens up the possibility of selecting the service intervals in accordance with demand, i.e., as a function of the actual wear on the monitored component. The service on an electric bicycle may be made very efficient in this way. The lifetime of the system as a whole is prolonged by service measures carried out promptly. Furthermore, service measures carried out promptly prevent failure or impaired functioning of the monitored component while cycling. The method according to the present invention thus makes a significant contribution toward ensuring the traffic safety of the electric bicycle.

To carry out the method according to the present invention, an electric bicycle is equipped with at least one sensor for monitoring the operating condition of at least one component. The stress on the monitored component is detected with the aid of this sensor. In addition, the device according to the present invention for detecting wear includes an evaluation unit for evaluating the sensor signal, the evaluation unit including a memory for storing the loads added up. At least one display unit is used to display service information when a predefined long-term load threshold for the monitored component has been reached. This may be a visual and/or acoustic display device. After successful service, the memory in which the total of the stresses is stored may be reset to take into account the new condition of the component.

It should be noted at this point that the device according to the present invention may also include multiple independent sensors for monitoring a component. Furthermore, with the aid of the device according to the present invention, it is also possible to monitor multiple independent components. In both cases, the device according to the present invention then includes an entire cluster of sensors and corresponding means for evaluating the sensor signals.

As already indicated, there are many different possibilities for use and thus for the design of the method according to the present invention and of the device according to the present invention.

Thus, for example, the vibrations of the frame and/or of the handlebar may be monitored with the aid of at least one acceleration sensor to detect stresses above the load profile of the corresponding component. According to the present invention, these stresses are added up and compared with a predefined operational strength limit for the component, to inform the cyclist of the possibility of a break in the frame or handlebar when this operational strength limit is reached or exceeded.

The vibration spectrum may also be used to estimate the tire pressure. The cyclist may be informed in this way that the tire pressure is too low in order to reduce the risk of a flat tire.

The lifetime of the battery of an electric bicycle may also be monitored with the aid of the method according to the present invention. For this purpose, the number of charging cycles, for example, may be detected easily since this represents a limiting factor for the lifetime of the battery. According to the present invention, the cyclist is then informed automatically and promptly of the need for changing the battery, so that the utilizability of the bicycle may be ensured.

From the standpoint of the traffic safety of the electric bicycle, it is important to monitor the operating condition of the brakes in particular. By observing the speed characteristic, it is possible to estimate when the brakes were used and how much energy was dissipated by braking. It is then possible to estimate from this information when the brake pads of the braking system must be replaced. Alternatively or in addition to the speed characteristic, the number of braking operations may also be detected easily, for example, with the aid of a switch to then compare them to a predetermined maximum number of braking operations.

A particularly advantageous application of the method according to the present invention involves monitoring the components of the chain drive since the efficiency of the chain drive depends to a significant extent on the condition of the chain and the sprocket wheels. In the case of the bicycle chain, the wear detection may be based on various criteria.

In the case of a derailleur gear system, the number of shifting operations has a significant influence on the aging of the chain. Accordingly, in one variant of the method according to the present invention, detecting wear on the chain is based on the number of shifting operations.

Alternatively or additionally, the operating condition of the chain may be monitored with the aid of at least one sensor, which detects the torques acting on the chain and in particular the critical torques. Thus the torques which occur during shifting and also the mechanical stresses on the chain during the cycling operation may be detected. Thus with the aid of a suitable torque sensor system, it is possible to determine, for example, how often critical torques occur and when a certain operational strength limit (Wöhler curve) has been exceeded, so that there is a need for service.

The gear selection is crucial for the wear on the pinion system. Frequent use of a certain gear results in premature wear on the corresponding pinion. Sensor-assisted gear detection may be used here for a precise evaluation of the wear.

In a particularly advantageous variant of the method according to the present invention, the motor current of the electric motor is detected to monitor the operating condition of the force/torque-transmitting components of the chain drive. According to the present invention, the ripple component of this current signal is ascertained and compared with the ripple component of a reference signal. The reference signal corresponds to the current signal, which is detected when the chain drive is equipped with a new chain and new sprocket wheels. A condition of wear is identified when the deviation between the ripple component of the detected current signal and the ripple component of the reference signal exceeds a predefined measure. It is important that both the wear on the chain and the wear on the sprocket wheels are reflected in the ripple component of the motor current signal.

Detecting wear on the basis of the ripple component of the motor current signal is based on the following considerations:

Each electric motor has its own torque ripple, which is attributed to so-called ripple torques. These ripple torques occur independently of the specific topology of the electric motor and are typically made up of two components, namely magnetic cogging torques and electrodynamic cogging torques. The magnetic cogging torques are attributed to the mechanical design of the electric motor, namely essentially to the presence of grooves in the rotor and/or stator and to the magnetic poles in the case of a permanent-field electric machine. Electrodynamic cogging torques are attributable to the energization of the motor and in particular to the commutation. The commutation is implemented mechanically in the case of a dc motor, but it may also be implemented electronically, as in the case of a BLDC motor.

According to the present invention, it has been recognized that the torque ripple of the electric motor is influenced by the type of torque transmission of the chain drive.

The bicycle chain surrounds a sprocket wheel like a polygon, so that the effective diameter of the wheel fluctuates. The chain velocity also fluctuates accordingly at a constant angular velocity of the driving sprocket wheel. This effect is known as the polygon effect. This effect is strongly pronounced in the case of sprocket wheels having a smaller number of teeth in particular, such as those used in the chain drive of electric bicycles. Additional forces occur due to this polygon effect, thus affecting the torque ripple of the electric motor.

The effective chain pitch also changes when the chain becomes longer. The sprocket wheels are also subject to greater wear, whereby the effective diameter of the driving sprocket wheel changes. Both of these effects influence the torque ripple of the electric motor.

The torque ripple of the electric motor is reflected in the motor current ripple since there is a linear relationship between load torque M of the motor and measured motor current I: $M = k \cdot \Phi \cdot I$, where $k \cdot \Phi$ is a motor constant. The ripple component of load torque M corresponds to the ripple component of motor current I.

According to the present invention, the deviation in the torque ripple from the new condition of the chain drive due to wear is ascertained and evaluated on the basis of the detected motor current.

In an advantageous variant of the method according to the present invention, the amplitude of the ripple component of the detected current signal is compared with the amplitude of the ripple component of the reference signal since wear on the chain drive generally results in an increased ripple amplitude. A characteristic variable may therefore be formed from the quotient of the maximum amplitude of the ripple component of the detected current signal and the motor frequency to compare this characteristic variable with the corresponding characteristic variable of the reference signal. In this case, a wear condition is identified when the amplitude or the characteristic variable of the detected current signal is significantly greater than a defined threshold value.

The motor current may be monitored constantly with the aid of the sensor system already present on an electric bicycle. However, the current signal need not be analyzed continuously since wear on the torque-transmitting parts of the chain drive does not occur suddenly and is instead the result of constant use. Instead it is sufficient to analyze the current signal regularly. It is advisable to carry out the signal analysis for a certain operating case of the electric motor to obtain comparable results. The steady-state operating case is suggested for this purpose. In this case, the average motor current is constant over a predefined minimum duration, so that a change in the torque ripple due to acceleration or braking operations may be ruled out. The deviation between the ripple component of the detected current signal and the ripple component of the reference signal may be ascertained automatically, at certain intervals or optionally ascertained in an operation initiated via a suitable user interface.

Depending on the evaluation algorithm, it may be advisable to display a wear condition only when the average of the deviation between the ripple component of the detected current signal and the ripple component of the reference signal exceeds a predefined measure over a certain period of time.

DETAILED DESCRIPTION OF THE INVENTION

Figure 1:
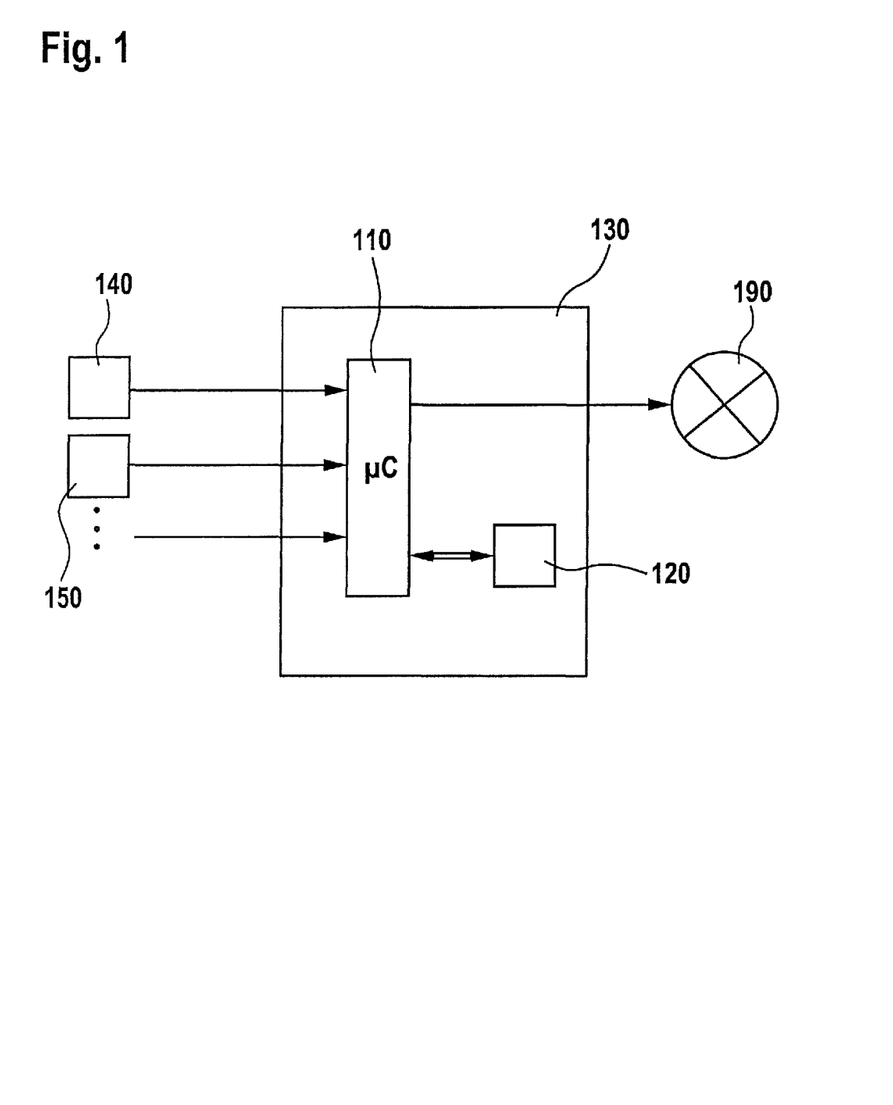
FIG. 1 shows a block diagram of a device according to the present invention for detecting wear on an electric bicycle.
Figure 2:
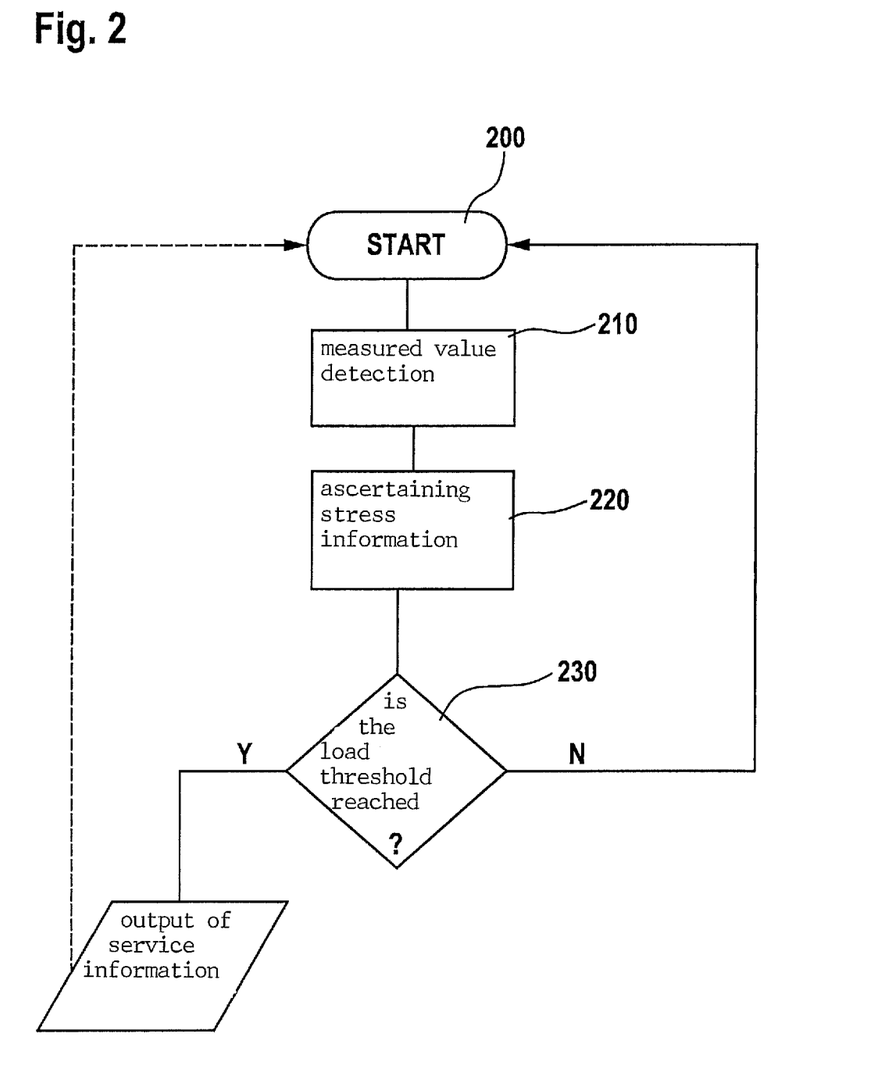
FIG. 2 shows a flow chart of the method according to the present invention for detecting wear.

The block diagram in FIG. 1 illustrates the interaction of the individual components of a device 100 for detecting wear on an electric bicycle according to the method depicted in the flow chart in FIG. 2. Device 100 includes a set of sensors 140, 150, . . . , which detect information about the operating condition and the stress on the components of the electric bicycle to be monitored. This sensor information is sent to a µC 110, which is connected to a data memory 120 for storing and retrieving data. Together with data memory 120, µC 110 forms an evaluation unit 130. Finally, device 100 also includes a display unit 190, which is triggered by µC 110 when the evaluation of the sensor information reveals that a predefined long-term load threshold has been reached for one or more of the bicycle components being monitored.

The method according to the present invention for detecting wear may be carried out automatically, for example, always or at regular intervals during cycling operation, or it may be started manually. In a first method step 210 after start 200, measured variables are detected with the aid of sensors 140, 150, . . . . In another method step 220, information about the operating condition and the stress on the bicycle components to be monitored is ascertained on the basis of these measured variables. The information thereby obtained is compared with a long-term load threshold defined for the corresponding bicycle component in method step 230. If the long-term load threshold is reached or exceeded, corresponding service information is displayed on display unit 190 before the method is repeated. Otherwise the method returns directly back to start 200.

Figure 3:
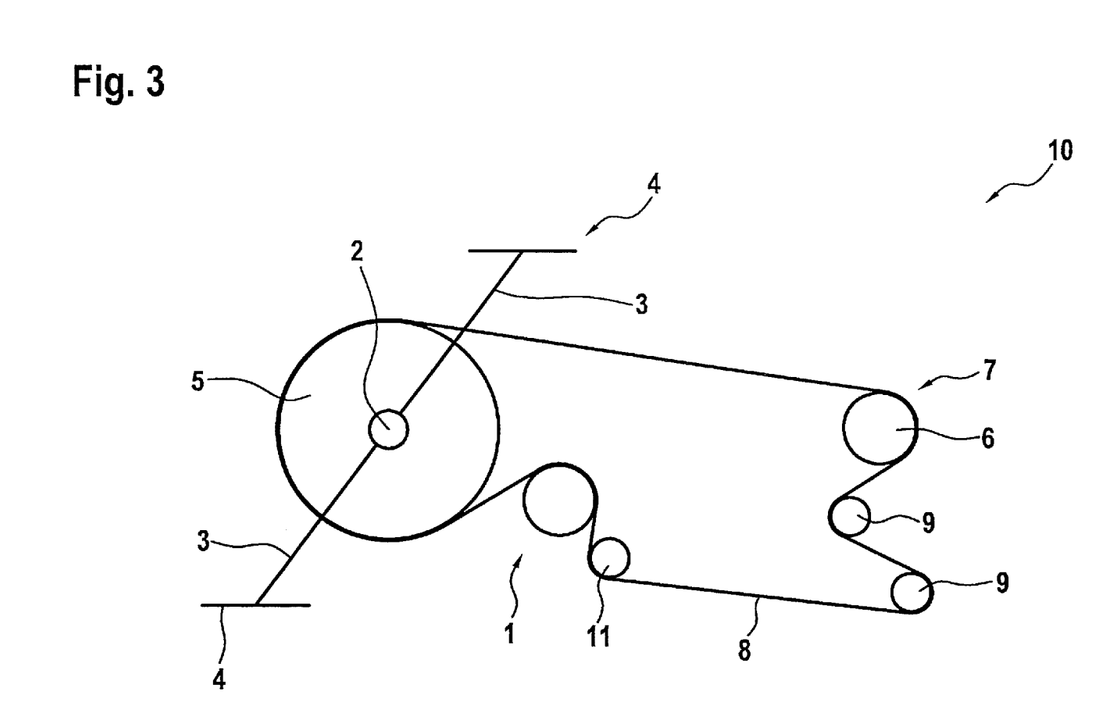
FIG. 3 shows a possible design of the chain drive of an electric bicycle in a schematic diagram.

The method according to the present invention for detecting wear on at least one component of an electric bicycle is described below as an example for chain drive 10 shown in FIG. 3 for an electric bicycle.

This chain drive 10 includes an electric motor 1 which drives driveshaft 2. Furthermore, crank arms 3 including pedals 4 for the cyclist sit on driveshaft 2. Driveshaft 2 is equipped with at least one chain ring 5. The rear wheel axle forms output shaft 6 of chain drive 10. At least one pinion 7 sits on output shaft 6. Driveshaft 2 and output shaft 6 are operatively connected via a closed chain 8, which is guided over a chain ring 5 of driveshaft 2 and a pinion 7 of output shaft 6. Chain 8 transmits the torque acting on driveshaft 2 to output shaft 6 and to the rear wheel in this way. Finally, chain drive 10 also includes a gear shift fork having two sprocket wheels 9 which is situated on the rear wheel axle as part of a derailleur gear. A third sprocket wheel 11 functions as the chain guide for electric motor 1.

In the exemplary embodiment shown here, electric motor 1 is situated in the area of driveshaft 2.

Electric motor 1 is a BLDC motor. The commutation is implemented here with the aid of trigger circuit 20 shown in FIG. 4. This circuit 20 includes a current sensor 21, which detects the motor current. Arrow 22 indicates that the current signal is sent to an evaluation unit. The condition of the chain and sprocket wheels of the chain drive is monitored through corresponding evaluation of the motor current signal, and information about wear on the chain drive is displayed promptly.

Figure 4:
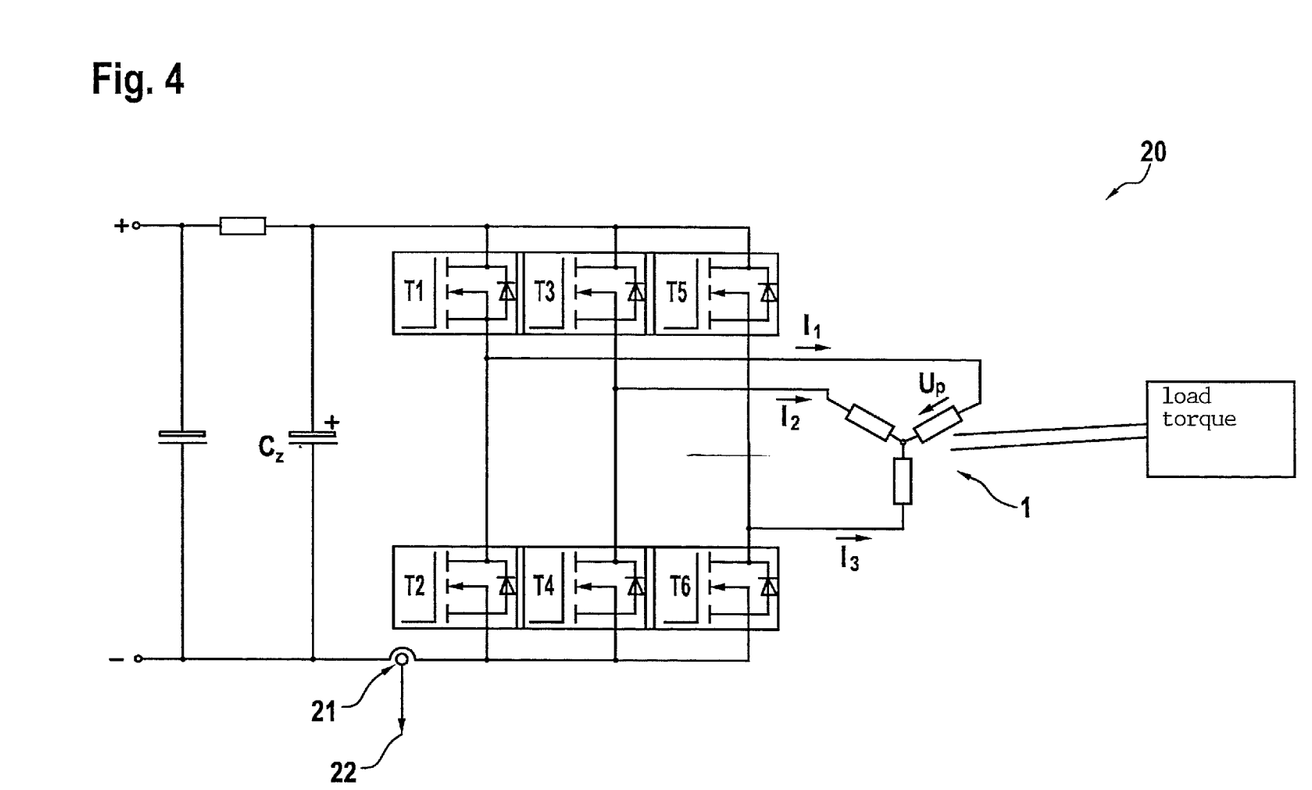
FIG. 4 shows a circuit diagram of a BLDC drive having a sensor for detecting the motor current.

For this purpose, the ripple component of the detected current signal is ascertained and compared with the ripple component of a reference signal, namely with the ripple component of the current signal which was detected during operation of the electric motor using a new chain drive.

There is a linear relationship between motor current I and load torque M of the electric motor: $M = k \cdot \Phi \cdot I$. The ripple component, i.e., the angle-dependent ripple of the measured motor current, therefore corresponds to the ripple component of the load torque of the electric motor. This is illustrated by the diagram in FIG. 5, in particular by curves 31 representing the angle dependence of the motor current and curve 32 showing the angle dependence of the motor load torque. This motor load torque is superimposed on the so-called magnetic cogging torques and electrodynamic cogging torques. The angle dependence is shown here in curves 33 and 34. This yields curve 35 as the total torque of electric motor 10.

Figure 5:
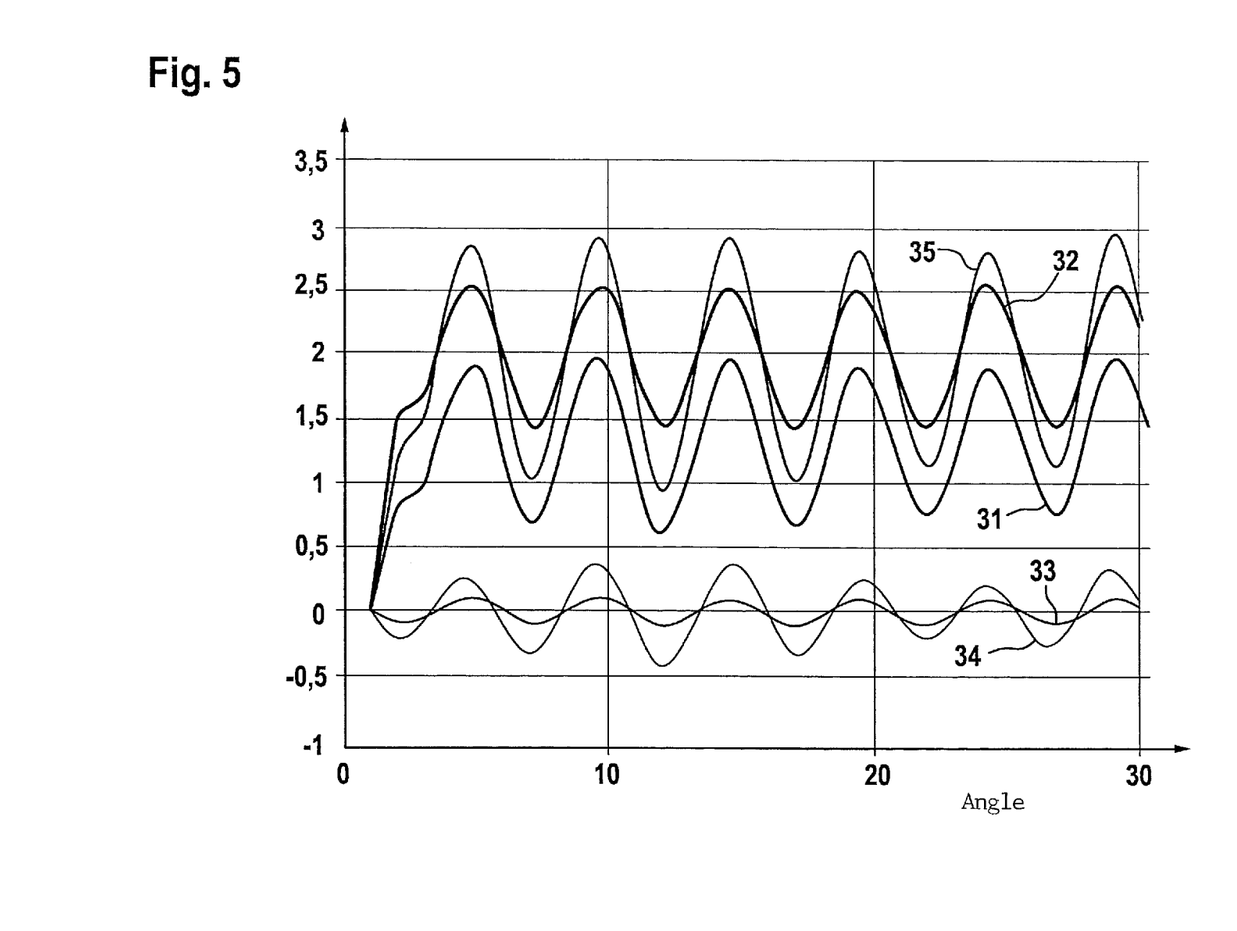
FIG. 5 illustrates the composition and effect of the ripple component on the load torque of an electric motor on the basis of a diagram, which illustrates the angle dependence of the individual signals.

In the case of wear on the chain drive, additional cogging torques occur, increasing the total torque of the electric motor and in particular the ripple component of the total torque and thus also of the motor current. A characteristic variable, for example, the quotient of the maximum amplitude of the ripple component and the motor frequency, is derivable from the amplitude of the ripple component, this frequency then being compared easily with a predefined threshold value. This threshold value is determined from the corresponding characteristic variable of the reference signal and stored in a memory of motor control 20.

Although the motor current is detected continuously, it is sufficient to ascertain the ripple component of the current signal and its characteristic variable at regular intervals and to compare the result with the stored threshold value. This advantageously takes place automatically but may also be initiated by the cyclist via a corresponding interface.

The condition of the chain drive is identified as a condition of wear only when the characteristic variable of the measured current signal significantly exceeds the stored threshold value. In this context, it has proven advisable to base the threshold value comparison on an average of multiple successive measurements or to incorporate a reference hysteresis.

Figure 6:
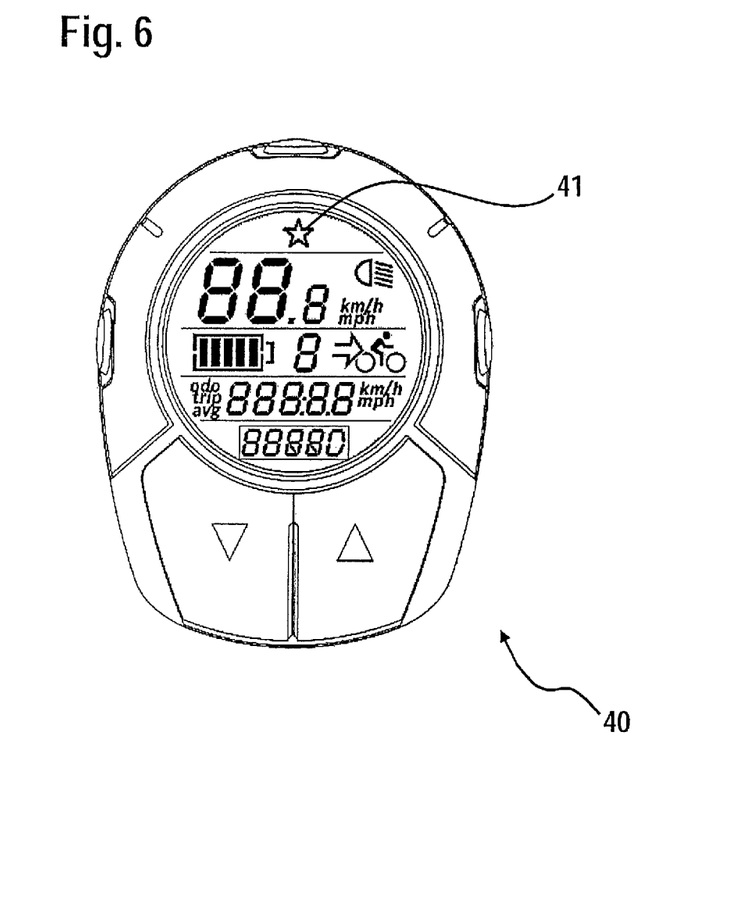
FIG. 6 shows the operating display of an electric bicycle on which service information may also be displayed.

When the wear limit is reached, service information is sent to the cyclist, for example, through a corresponding symbol 41 on an operating display 40 as shown in FIG. 6. Symbol 41 represents a chain as a sign that the chain should be replaced. As another symbol, a chain and a pinion may also be shown to indicate that both the chain and a pinion must be replaced. After the appropriate service, the display is reset either manually or automatically since the characteristic value ascertained for the current signal is now again below the threshold value.

More detailed information about the condition of the chain drive and the required service measures may also be provided to the cyclist on a larger display.

What is claimed is:

1. A method for detecting wear on at least one component of an electric bicycle, comprising:
   monitoring an operating condition of the at least one component of the bicycle with the aid of at least one sensor;
   detecting a stress on the component based on an operating time of the at least one component;
   displaying on a display unit a need for service as soon as a long-term load threshold defined for the at least one component is reached, wherein the component is a drive train component, and wherein the stress relates to a mechanical wearing out of the drive train component, wherein the long-term load threshold represents a threshold that if met or exceeded indicates that the component requires servicing or replacement, wherein the drive train component is driven by an electric motor;
   detecting a ripple component of a current of the electric motor;
   comparing the detected ripple component to a ripple component of a reference signal; and
   indicating that the mechanical wearing of the drive train component is present if a deviation between the detected ripple component and the ripple component of the reference signal exceeds a predefined value.

2. The method as recited in claim 1, wherein vibrations of at least one of a frame and a handlebar of the electric bicycle are detected with the aid of at least one acceleration sensor and displayed as soon as a predefined operational strength limit is reached.

3. The method as recited in claim 1, wherein a number of charging cycles of a battery of the electric bicycle is detected with the aid of at least one sensor and displayed as soon as a predefined number of charging cycles is reached.

4. The method as recited in claim 1, wherein an operating condition of a brake is monitored with the aid of at least one sensor by at least one of (i) detecting a speed characteristic of the vehicle and (ii) detecting the number of braking operations.

5. The method as recited in claim 1, wherein an operating condition of a chain of the electric bicycle is monitored with the aid of at least one sensor which detects the number of shift operations of the chain.

6. The method as recited in claim 1, wherein an operating condition of a chain of the electric bicycle is monitored with the aid of at least one sensor which detects an applied torque.

7. The method as recited in claim 1, wherein an operating condition of a chain of the electric bicycle is monitored with the aid of at least one sensor which detects a distance traveled by the electric bicycle.

8. The method as recited in claim 1, wherein an operating condition of a chain of the electric bicycle is monitored with the aid of at least one sensor which detects an engaged gear.

9. The method as recited in claim 1, wherein a sensor detects when a tire pressure is outside a predefined pressure range.

10. The method as recited in claim 1, wherein:
    the drive train component is part of a chain drive of the electric bicycle and the electric motor drives at least one driveshaft having at least one sprocket wheel, at least one output shaft which is also equipped with at least one sprocket wheel, and at least one closed chain which is guided over the sprocket wheel of the driveshaft and the sprocket wheel of the output shaft such that the closed chain transmits a torque acting on the driveshaft to the output shaft;
    the reference signal corresponds to a current signal which is detected when the chain drive is equipped with a new chain and new sprocket wheels.

11. The method as recited in claim 10, wherein an amplitude of the ripple component of the detected current signal of the motor current is compared with an amplitude of the ripple component of the reference signal.

12. The method as recited in claim 11, wherein a characteristic variable of the detected current signal is formed from a quotient of the maximum amplitude of the ripple component of the detected current signal and the motor frequency, and wherein the characteristic variable of the detected current signal is compared with a corresponding characteristic variable of the reference signal.

13. The method as recited in claim 12, wherein a wear condition is identified when the characteristic variable of the detected current signal is greater than a defined threshold value.

14. The method as recited in claim 10, wherein the deviation between the ripple component of the detected current signal of the motor current and the ripple component of the reference signal is ascertained only in a steady-state operation of the electric motor, wherein the steady-state operation is defined as when the average motor current is constant over a predefined minimum duration.

15. The method as recited in claim 14, wherein the deviation between the ripple component of the detected current signal of the motor current and the ripple component of the reference signal is ascertained automatically at predefined intervals.

16. The method as recited in claim 10, wherein a wear condition is displayed only when the average of the deviation between the ripple component of the detected current signal of the motor current and the ripple component of the reference signal exceeds a predefined value for a predefined period of time.

17. A device for detecting wear on at least one component of an electric bicycle, comprising:
    at least one sensor configured to (i) monitor an operating condition of the at least one component of the bicycle with the aid of at least one sensor and (ii) detect a stress on the component based on an operating time of the at least one component;
    an evaluation unit having at least one memory, wherein the evaluation unit is configured to evaluate a sensor signal from the at least one sensor; and
    at least one display unit configured to display a need for service as soon as the evaluation unit determines a long-term load threshold defined for the at least one component has been reached, wherein the component is a drive train component, and wherein the stress relates to a mechanical wearing out of the drive train component, wherein the long-term load threshold represents a threshold that if met or exceeded indicates that the component requires servicing or replacement, wherein the drive train component is driven by an electric motor, and wherein the evaluation unit:
    detects a ripple component of a current of the electric motor;
    compares the detected ripple component to a ripple component of a reference signal, and indicates that the mechanical wearing out of the drive train component is present if a deviation between the detected ripple component and the ripple component of the reference signal exceeds a predefined value.

* * * * *